(12) United States Patent
Cody et al.

(10) Patent No.: US 6,951,605 B2
(45) Date of Patent: Oct. 4, 2005

(54) METHOD FOR MAKING LUBE BASESTOCKS

(75) Inventors: Ian A. Cody, Baton Rouge, LA (US); William J. Murphy, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 25 days.

(21) Appl. No.: 10/678,435

(22) Filed: Oct. 3, 2003

(65) Prior Publication Data

US 2004/0108248 A1 Jun. 10, 2004

Related U.S. Application Data

(60) Provisional application No. 60/416,865, filed on Oct. 8, 2002, and provisional application No. 60/416,870, filed on Oct. 8, 2002.

(51) Int. Cl.$^7$ ............................................. C10G 67/04
(52) U.S. Cl. ............................. 208/87; 208/89; 208/27
(58) Field of Search ................................ 208/87, 89, 27

(56) References Cited

U.S. PATENT DOCUMENTS

| | | | |
|---|---|---|---|
| 2,250,410 A | 7/1941 | Van Peski | 260/676 |
| 3,711,399 A | 1/1973 | Estes | 208/112 |
| 4,097,364 A | 6/1978 | Egan | 208/111 |
| 4,181,597 A | 1/1980 | Yan et al. | 208/46 |
| 4,335,019 A | 6/1982 | Bowes et al. | 252/450 |
| 4,377,469 A | 3/1983 | Shihabi | 208/111 |
| 4,388,177 A | 6/1983 | Bowes et al. | 208/111 |
| 4,402,866 A | 9/1983 | Shihabi | 252/455 |
| 4,431,516 A | 2/1984 | Baird et al. | 208/111 |
| 4,431,517 A | 2/1984 | Nevitt et al. | 208/111 |
| 4,431,519 A | 2/1984 | LaPierre et al. | 208/111 |
| 4,431,527 A | 2/1984 | Miller et al. | 208/254 |
| 4,436,614 A | 3/1984 | Olbrich et al. | 208/89 |
| 4,460,698 A | 7/1984 | Hensley, Jr. et al. | 502/66 |
| 4,483,764 A | 11/1984 | Hensley, Jr. et al. | 208/111 |
| 4,490,242 A | 12/1984 | Oleck et al. | 208/97 |
| 4,510,045 A | 4/1985 | Dessau | 208/111 |
| 4,568,449 A | 2/1986 | Angmorter et al. | 208/215 |
| 4,594,146 A | 6/1986 | Chester et al. | 208/111 |
| 4,599,162 A | 7/1986 | Yen | 208/59 |
| 4,601,993 A | 7/1986 | Chu et al. | 502/66 |
| 4,610,778 A | 9/1986 | Graven | 208/89 |
| 4,622,130 A | 11/1986 | Stem | 208/87 |
| 4,636,299 A | 1/1987 | Unmuth et al. | 208/87 |
| 4,684,756 A | 8/1987 | Derr, Jr. et al. | 585/330 |
| 4,784,747 A | 11/1988 | Shihabi | 208/111 |
| 4,810,357 A | 3/1989 | Chester et al. | 208/78 |
| 4,911,821 A | 3/1990 | Katzer et al. | 208/27 |
| 4,919,788 A | 4/1990 | Chen et al. | 208/59 |
| 4,975,177 A | 12/1990 | Garwood et al. | 208/27 |
| 5,017,535 A | 5/1991 | Schoonhoven et al. | 502/30 |
| 5,037,528 A | 8/1991 | Garwood et al. | 208/27 |
| 5,059,299 A | 10/1991 | Cody et al. | 208/27 |
| 5,075,269 A | 12/1991 | Degnan et al. | 502/77 |
| 5,146,022 A | 9/1992 | Buchanan et al. | 585/12 |
| 5,208,403 A | 5/1993 | Buchanan et al. | 585/7 |
| 5,232,579 A | 8/1993 | Absil et al. | 208/113 |
| 5,246,566 A | 9/1993 | Miller | 208/27 |
| 5,275,719 A | 1/1994 | Baker, Jr. et al. | 208/58 |
| 5,276,229 A | 1/1994 | Buchanan et al. | 585/255 |
| 5,288,395 A | 2/1994 | Marler et al. | 208/58 |
| 5,358,628 A | 10/1994 | Apelian et al. | 208/60 |
| 5,498,821 A | 3/1996 | Ryan et al. | 585/750 |
| 5,516,736 A | 5/1996 | Chang et al. | 502/64 |
| 5,643,440 A | 7/1997 | Borghard et al. | 208/58 |
| 5,689,031 A | 11/1997 | Berlowitz et al. | 585/734 |
| 5,730,858 A | 3/1998 | Olivier et al. | 208/28 |
| 5,837,639 A * | 11/1998 | Kresge et al. | 502/64 |
| 5,911,874 A | 6/1999 | Cody et al. | 208/87 |
| 5,935,417 A | 8/1999 | Cody et al. | 208/87 |
| 5,951,848 A | 9/1999 | Baker, Jr. et al. | 208/28 |
| 5,993,644 A | 11/1999 | Xiao et al. | 208/89 |
| 6,013,171 A | 1/2000 | Cook et al. | 208/27 |
| 6,051,129 A | 4/2000 | Harris et al. | 208/138 |
| 6,080,301 A | 6/2000 | Berlowitz et al. | 208/18 |
| 6,090,989 A | 7/2000 | Trewella et al. | 585/13 |
| 6,096,189 A | 8/2000 | Cody et al. | 208/87 |
| 6,099,719 A | 8/2000 | Cody et al. | 208/87 |
| 6,103,101 A | 8/2000 | Fragelli et al. | 208/89 |
| 6,136,181 A | 10/2000 | Ziemer | 208/144 |
| 6,179,994 B1 | 1/2001 | Clark et al. | 208/27 |

(Continued)

FOREIGN PATENT DOCUMENTS

| | | | |
|---|---|---|---|
| EP | 0140468 | 8/1985 | ........... C10G/67/04 |
| EP | 0147873 | 9/1988 | |
| EP | 0635557 | 1/1995 | ........... C10G/65/00 |
| EP | 0707057 | 4/1996 | ........... C10G/45/58 |
| EP | 0776959 | 4/1997 | ........... C10G/65/04 |
| EP | 0909304 | 9/2001 | ........... C10G/65/08 |
| FR | 2805543 | 2/2000 | ........... C10G/69/02 |
| FR | 2805542 | 8/2001 | ........... C10G/69/02 |
| GB | 772478 | 4/1957 | |
| GB | 1582789 | 1/1981 | ........... C10G/45/64 |
| GB | 2109402 | 6/1983 | ........... C10G/45/64 |
| GB | 2311789 | 10/1997 | ........... C10G/65/12 |
| SU | 1696391 | 7/1991 | ........... C10G/47/20 |
| WO | WO 97/18278 | 5/1997 | ........... C10G/47/00 |
| WO | WO 99/20720 | 4/1999 | ........ C10M/143/08 |
| WO | WO 99/41336 | 8/1999 | ........... C10G/71/00 |
| WO | WO 01/07538 | 2/2001 | ........... C10G/45/64 |
| WO | WO 01/18156 | 3/2001 | ........ C10M/101/02 |
| WO | WO 01/64339 | 7/2001 | ........... C10G/45/64 |
| WO | WO 01/64339 | 9/2001 | ............ B01J/29/74 |
| WO | WO 02/48283 | 6/2002 | ............ C10G/1/04 |
| WO | WO 02/48291 | 6/2002 | ........... C10G/67/04 |
| WO | WO 02/88279 | 11/2002 | ........... C10G/73/38 |
| WO | WO 02/99014 | 12/2002 | ........... C10G/65/04 |

*Primary Examiner*—Walter D. Griffin
(74) *Attorney, Agent, or Firm*—Jeremy J. Kliebert; Gerard J. Hughes

(57) ABSTRACT

A method to produce high quality lube oil products involving hydrotreating a waxy feed to produce a hydrotreated feed and subsequently hydrodewaxing the hydrotreated feed and hydrofinishing the hydrodewaxed feed.

18 Claims, No Drawings

U.S. PATENT DOCUMENTS

| | | | |
|---|---|---|---|
| 6,190,532 B1 | 2/2001 | Degnan et al. | 208/27 |
| 6,231,749 B1 | 5/2001 | Degnan et al. | 208/27 |
| 6,264,826 B1 | 7/2001 | Xiao et al. | 208/18 |
| 6,294,077 B1 | 9/2001 | Dougherty et al. | 208/27 |
| 6,310,265 B1 | 10/2001 | Chester et al. | 585/739 |
| 6,322,692 B1 | 11/2001 | Cody et al. | 208/18 |
| 6,337,010 B1 | 1/2002 | Hofer | 208/58 |
| 6,420,618 B1 | 7/2002 | Berlowitz et al. | 585/310 |
| 6,663,768 B1 | 12/2003 | Miller | 208/27 |
| 2001/0004972 A1 | 6/2001 | Miller et al. | 208/18 |
| 2001/0006154 A1 | 7/2001 | Krug et al. | 208/18 |
| 2002/0003102 A1 | 1/2002 | O'Rear et al. | 208/18 |
| 2003/0168379 A1 | 9/2003 | Degnan et al. | 208/27 |

\* cited by examiner

METHOD FOR MAKING LUBE BASESTOCKS

CROSS-REFERENCE TO RELATED APPLICATIONS

This application claims benefit of U.S. Provisional Patent Applications Ser. Nos. 60/416,865 and 60/416,870, both filed on Oct. 8, 2002.

FIELD OF THE INVENTION

This invention relates to a process for preparing lubricating oil basestocks having a high viscosity index (VI) from wax containing feeds. More particularly, a wax containing feedstock is hydrotreated under mild conditions, catalytically hydrodewaxed and hydrofinished.

BACKGROUND OF THE INVENTION

Historically, lubricating oil products for use in applications such as automotive engine oils have used additives to improve specific properties of the basestocks used to prepare the finished products. With the advent of increased environmental concerns, the performance requirements for the basestocks themselves have increased. American Petroleum Institute (API) requirements for Group II basestocks include a saturates content of at least 90%, a sulfur content of 0.03 wt. % or less and a viscosity index (VI) between 80 and 120. The requirements for Group III basestocks are those of Group II basestocks except that the VI is at least 120.

Conventional techniques for preparing basestocks such as hydrocracking or solvent extraction require severe operating conditions such as high pressure and temperature or high solvent:oil ratios and high extraction temperatures to reach these higher basestock qualities. Either alternative involves expensive operating conditions and low yields.

Hydrocracking has been combined with hydrotreating as a preliminary step. However, this combination also results in decreased yields of lubricating oils due to the conversion to distillates that typically accompany the hydrocracking process.

It would be desirable to have a economical process for preparing Group III basestocks in high yields by minimizing conversion to low boiling distillates while at the same time producing a product having excellent low temperature properties, high VI and high stability.

SUMMARY OF THE INVENTION

The present invention is directed at a process to prepare lubricating oil basestocks having a VI of about 110 to about 130 from a lube oil boiling range feedstock.

The process comprises:
a) conducting a lubricating oil feedstock to a solvent extraction zone and underextracting the lubricating oil feedstock under conditions effective at producing at least an aromatics-lean raffinate solution;
b) removing at least a portion of the extraction solvent from the aromatics-lean raffinate solution to produce a raffinate feedstock having a dewaxed oil viscosity index from about 75 to about 105 and a wax content of greater than 15 wt. %;
c) contacting the raffinate feedstock with a hydrotreating catalyst in a first reaction stage operated under effective conditions to produce at least a gaseous product and a hydrotreated feedstock
d) stripping the hydrotreated feedstock to separate at least a portion of the gaseous product from the hydrotreated feedstock to produce a stripped feedstock; and
e) contacting the stripped feedstock with at least one dewaxing catalyst in a dewaxing zone operated under effective hydrodewaxing conditions, wherein said dewaxing catalyst contains at least one Group VIII noble metal and is selected from ZSM-5, ZSM-22, ZSM-23, ZSM-35, ZSM-48, ZSM-57, Beta, SSZ-31, SAPO-11, SAPO-31, SAPO-41, MAPO-11, ECR-42, fluorided alumina, silica-alumina, fluorided silica alumina, synthetic Ferrierites, Mordenite, Offretite, erionite, chabazite, and mixtures thereof thereby producing a lubricating oil basestock.

In one embodiment of the present invention, a hydrofinished lubricating oil basestock is produced by contacting the lubricating oil basestock with a hydrofinishing catalyst in a hydrofinishing zone operated under effective hydrofinishing conditions.

DETAILED DESCRIPTION OF THE INVENTION

It should be noted that the terms "feedstock" and "feedstream" as used herein are synonymous.

Lubricating Oil Feedstocks

The feedstock used in the process of the invention are wax-containing feeds that boil in the lubricating oil range, typically having a 10% distillation point greater than 650° F. (343° C.), measured by ASTM D 86 or ASTM 2887, and are derived from mineral sources, synthetic sources, or a mixture of the two. Non-limiting examples of suitable lubricating oil feedstocks include those derived from sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes.

These feedstocks may also have high contents of nitrogen- and sulfur-contaminants. Feeds containing up to 0.2 wt. % of nitrogen, based on feed and up to 3.0 wt. % of sulfur can be processed in the present process. Feeds having a high wax content typically have high viscosity indexes of up to 200 or more. Sulfur and nitrogen contents may be measured by standard ASTM methods D5453 and D4629, respectively.

Raffinate Feedstocks

The raffinate feedstocks used herein are derived from a solvent extraction process. In a solvent extraction process as contemplated herein, the lube oil feedstocks defined above are solvent extracted. The solvent extraction process selectively dissolves the aromatic components in an aromatics-rich extract solution while leaving the more paraffinic components in the "aromatics-lean raffinate solution". Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases.

In the solvent extraction process, the lube oil feedstocks are subjected to solvent extraction in a solvent extraction zone. In the solvent extraction zone, a lube oil boiling range feedstock as defined above, is contacted with an extraction solvent. The extraction solvent used herein is not critical and can be any solvent known that has an affinity for aromatic hydrocarbons in preference to non-aromatic hydrocarbons. Non-limiting examples of such solvents include sulfolane, furfural, phenol, and N-methyl pyrrolidone ("NMP"). Furfural, phenol, and NMP are preferred.

The contacting of the lube oil boiling range feedstream with the extraction solvent can be accomplished by any suitable solvent extraction method. Non-limiting examples of such include batch, semi-batch, or continuous. It is preferred that the extraction process be a continuous process, and it is more preferred that the continuous process be operated in a counter-current fashion. In a counter-current configuration, it is preferred that the lube oil boiling range feedstream be introduced into the bottom of an elongated contacting zone or tower and caused to flow in an upward direction while the extraction solvent is introduced at the top of the tower and allowed to flow in a downward direction, counter-current to the upflowing lube oil boiling range feedstream. In this configuration, the lube oil boiling range feedstream is forced to pass counter-currently to the extraction solvent resulting in the intimate contact between the extraction solvent and the lube oil boiling range feedstock. The extraction solvent and the lube oil boiling range feedstream thus migrate to opposite ends of the contacting zone.

The contacting of the lube oil boiling range feedstream with the extraction solvent produces at least an aromatics-lean raffinate solution. The aromatics-lean raffinate solution is then treated to remove at least a portion of the extraction solvent contained therein, thus producing the raffinate used as a feedstock herein. The removal of at least a portion of the extraction solvent can be done by any means known in the art effective at separating at least a portion of an extraction solvent from an aromatics lean raffinate solution. Preferably the raffinate is produced by separating at least a portion of the first extraction solvent from the aromatics-lean raffinate solution in a stripping or distillation tower. By at least a portion, it is meant that at least about 80 vol %, preferably about 90 vol %, more preferably 95 vol %, based on the aromatics-lean raffinate solution, of the extraction solvent is removed from the aromatics-lean raffinate solution. Most preferably substantially all of the extraction solvent is removed.

It should be noted that the phrase "aromatics-lean raffinate solution" is not synonymous with the "raffinate". The phrase "aromatics-lean raffinate solution" is meant to refer to the products of solvent extraction before the solvent has been removed, i.e. distilled or stripped, from the respective phases. Thus, "raffinate", as used herein, refers to the raffinate product after at least a portion of the solvent contained in the "aromatics-lean raffinate solution has been removed.

It is preferred that the raffinates used herein be under extracted, i.e., the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. The raffinate from the solvent extraction unit is stripped of solvent and then sent to a hydrotreating unit (zone) containing a hydrotreating catalyst.

The raffinate feedstock to the hydrotreating zone is extracted to a dewaxed oil viscosity index of from about 75 to about 105, preferably 80 to 95, more preferably about 80 to about 85. The raffinate feedstock will also have a wax content greater than about 15 wt. % wax, preferably greater than about 40 wt. % wax. The wax content of a feed may be determined by nuclear magnetic resonance spectroscopy (ASTM D5292), by correlative ndM methods (ASTM D3238) or by solvent means (ASTM D3235).

Hydrotreating

For hydrotreating, the catalysts are those effective for hydrotreating such as catalysts containing at least one metal selected from Group VI metals, Group VIII metals, and mixtures thereof. Preferred metals include nickel, tungsten, molybdenum, cobalt and mixtures thereof. These metals or mixtures of metals are typically present as oxides or sulfides on refractory metal oxide supports. The amount of metals, either individually or in mixtures, for supported catalysts ranges from about 0.5 to 35 wt. %, based on the catalyst, while if a bulk or unsupported catalysts is used, the metals content can range as high as 98 wt. %, based on the catalyst. In the case of preferred mixtures of Group VIII metals with Group VI metals, the Group VIII metals are present in amounts ranging from about 0.5 to 5 wt. %, based on catalyst and the Group VI metals are present in amounts ranging from about 5 to 30 wt. %. The amounts of metals may be measured by atomic absorption spectroscopy, inductively coupled plasma-atomic emission spectrometry or other methods specified by ASTM for individual metals.

The hydrotreating catalysts used herein can be either supported, or bulk or unsupported. However, if the hydrotreating catalyst is supported, it is important that the metal oxide support used for the hydrotreating catalysts herein be non-acidic so as to control cracking. A useful scale of acidity for catalysts is based on the isomerization of 2-methyl-2-pentene as described by Kramer and McVicker, J. Catalysis, 92, 355 (1985). In this scale of acidity, 2-methyl-2-pentene is subjected to the catalyst to be evaluated at a fixed temperature, typically 200° C. In the presence of catalyst sites, 2-methyl-2-pentene forms a carbenium ion. The isomerization pathway of the carbenium ion is indicative of the acidity of active sites in the catalyst. Thus weakly acidic sites form 4-methyl-2-pentene whereas strongly acidic sites result in a skeletal rearrangement to 3-methyl-2-pentene with very strongly acid sites forming 2,3-dimethyl-2-butene. The mole ratio of -methyl-2-pentene to 4-methyl-2-pentene can be correlated to a scale of acidity, which ranges from 0.0 to 4.0. Very weakly acidic sites will have values near 0.0 whereas very strongly acidic sites will have values approaching 4.0. The catalysts useful in the present process have acidity values of less than about 0.5, preferably less than about 0.3. The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

Suitable metal oxide supports include low acidic oxides such as silica, alumina or titania, preferably alumina. Preferred aluminas are porous aluminas such as gamma or beta having average pore sizes from 50 to 200 Å, preferably 75 to 150 Å, a surface area from 100 to 300 m$^2$/g, preferably 150 to 250 m$^2$/g and a pore volume of from 0.25 to 1.0 cm$^3$/g, preferably 0.35 to 0.8 cm$^3$/g. The supports are preferably not promoted with a halogen such as fluorine as this generally increases the acidity of the support above 0.5.

Preferred metal catalysts include cobalt/molybdenum (1–5% Co as oxide, 10–25% Mo as oxide) nickel/molybdenum (1–5% Ni as oxide, 10–25% Co as oxide) or nickel/tungsten (1–5% Ni as oxide, 10–30% W as oxide) on alumina. Especially preferred are nickel/molybdenum catalysts such as KF-840.

Effective hydrotreating conditions as used herein typically include temperatures of from 150 to 400° C., preferably 200 to 350° C., a hydrogen partial pressure of from 1480 to 20786 kPa (200 to 3000 psig), preferably 2859 to 13891 kPa (400 to 2000 psig), a space velocity of from 0.1 to 10 liquid hourly space velocity (LHSV), preferably 0.1 to 5 LHSV, and a hydrogen to feed ratio of from 89 to 1780 m$^3$/m$^3$ (500 to 10000 scf/B), preferably 178 to 890 m$^3$/m$^3$.

Hydrotreating reduces the amount of nitrogen- and sulfur-containing contaminants to levels that will not unacceptably affect the dewaxing catalyst in the subsequent dewaxing step. Also, there may be certain polynuclear aromatic species that will pass through the present mild hydrotreating step. These contaminants, if present, will be removed in a subsequent hydrofinishing step.

Effective hydrotreating conditions are considered those conditions which when selected, result in less than 5 wt. % of the feedstock, preferably less than 3 wt. %, more preferably less than 2 wt. %, being converted to 650° F. (343° C.) minus products. Effective hydrotreating conditions are also those that when selected produce a hydrotreated feedstock whose VI increase is less than 4, preferably less than 3, more preferably less than 2 greater than the VI of the feedstock. The high wax contents of the present feeds results in minimal VI increase during the hydrotreating step.

The hydrotreated feedstock may be passed directly to the dewaxing step or preferably, stripped to remove gaseous contaminants such as hydrogen sulfide and ammonia prior to dewaxing. Stripping can be by conventional means such as flash drums or fractionators.

Dewaxing Catalyst

The dewaxing catalyst may be either crystalline or amorphous. Crystalline materials are molecular sieves that contain at least one 10 or 12 ring channel and may be based on aluminosilicates (zeolites) or on aluminophosphates such as silicoaluminophosphates (SAPO's) and MAPO's. Zeolites used for oxygenate treatment may contain at least one 10 or 12 channel. Examples of such zeolites include ZSM-22, ZSM-23, ZSM-35, ZSM-48, ZSM-57, ferrierite, ITQ-13, MCM-68 and MCM-71. Examples of aluminophosphates containing at least one 10 ring channel include ECR-42. Examples of molecular sieves containing 12 ring channels include zeolite beta, and MCM-68. The molecular sieves are described in U.S. Pat. Nos. 5,246,566, 5,282,958, 4,975,177, 4,397,827, 4,585,747, 5,075,269 and 4,440,871. MCM-68 is described in U.S. Pat. No. 6,310,265. MCM-71 and ITQ-13 are described in PCT published applications WO 0242207 and WO 0078677. ECR-42 is disclosed in U.S. Pat. No. 6,303,534. Suitable SAPO's for use herein include SAPO-11, SAPO-31, SAPO-41, and suitable MAPO's include MAPO-11. SSZ-31 is also a catalyst that can be effectively used herein. Preferred catalysts include ZSM-48, ZSM-22 and ZSM-23. Especially preferred is ZSM-48. The molecular sieves are preferably in the hydrogen form. Reduction can occur in situ during the dewaxing step itself or can occur ex situ in another vessel.

Amorphous dewaxing catalysts include alumina, fluorided alumina, silica-alumina, fluorided silica-alumina and silica-alumina doped with Group IIIB metals. Such catalysts are described for example in U.S. Pat. Nos. 4,900,707 and 6,383,366. The dewaxing catalysts used herein are bifunctional, i.e., they are loaded with at least one metal hydrogenation component, which is selected from Group VI metals, Group VIII metals, or mixtures thereof. Preferred metals are selected from Group VIII metals. Especially preferred are Group VIII noble metals such as Pt, Pd or mixtures thereof. These metals are loaded at the rate of 0.1 to 30 wt. %, based on catalyst. Catalyst preparation and metal loading methods are described for example in U.S. Pat. No. 6,294,077, and include for example ion exchange and impregnation using decomposable metal salts. Metal dispersion techniques and catalyst particle size control techniques are described in U.S. Pat. No. 5,282,958. Catalysts with small particle size and well-dispersed metal are preferred.

The molecular sieves are typically composited with binder materials which are resistant to high temperatures which may be employed under dewaxing conditions to form a finished dewaxing catalyst or may be binderless (self bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina -thoria and silica-alumina magnesia. The amount of molecular sieve in the finished dewaxing catalyst is from 10 to 100, preferably 35 to 100 wt. %, based on catalyst. Such catalysts are formed by methods such spray drying, extrusion and the like. The dewaxing catalyst may be used in the sulfided or unsulfided form, and is preferably in the sulfided form.

Effective dewaxing conditions as used herein includes temperatures of from 250–400° C., preferably 275 to 350° C., pressures of from 791 to 20786 kPa (100 to 3000 psig), preferably 1480 to 17339 kPa (200 to 2500 psig), liquid hourly space velocities of from 0. 1 to 10 hr$^{-1}$, preferably 0.1 to 5 hr$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

Hydrofinishing

In a preferred embodiment, at least a portion of the product from dewaxing is passed directly to a hydrofinishing step without disengagement. It is preferred to hydrofinish the product resulting from dewaxing in order to adjust product qualities to desired specifications. Hydrofinishing is a form of mild hydrotreating directed to saturating any lube range olefins and residual aromatics as well as to removing any remaining heteroatoms and color bodies. The post dewaxing hydrofinishing is usually carried out in cascade with the dewaxing step. Generally the hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 LHSV (hr$^{-1}$), preferably 0.5 to 3 hr$^{-1}$ and hydrogen treat gas rates of from 44.5 to 1780 m$^3$/m$^3$ (250 to 10,000 scf/B).

Hydrofinishing catalysts are those containing at least one metal selected from Group VI metals, Group VIII metals, and mixtures thereof. Preferred metals include at least one noble metal having a strong hydrogenation function, especially platinum, palladium and mixtures thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst is often as high as about 20 weight percent for non-noble metals. Noble metals are usually present in amounts no greater than about 1 wt. %.

The hydrofinishing catalyst is preferably a mesoporous material belonging to the M41S class or family of catalysts. The M41S family of catalysts are mesoporous materials having high silica contents whose preparation is further described in J. Amer. Chem. Soc., 1992, 114, 10834. Examples included MCM-41, MCM-48 and MCM-50. Mesoporous refers to catalysts having pore sizes from 15 to 100 Å. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 15 to 100 Angstroms. MCM-48 has a cubic symmetry and is described for example is U.S. Pat. No. 5,198,203 whereas MCM-50 has a lamellar structure. MCM-41 can be made with different size pore openings in the mesoporous range. The mesoporous materials may bear a metal hydrogenation component which is at least one Group VIII metal. Preferred are Group VIII noble metals, most preferably Pt, Pd or mixtures thereof.

As stated above, typical hydrofinishing conditions include temperatures from about 150° C. to 350° C., preferably 180° C. to 250° C. Total pressures are typically from 2859 to 20786 kPa (about 400 to 3000 psig). Liquid hourly space velocity is typically from 0.1 to 5 LHSV ($hr^{-1}$), preferably 0.5 to 3 $hr^{-1}$ and hydrogen treat gas rates of from 44.5 to 1780 $m^3/m^3$ (250 to 10,000 scf/B). Effective hydrofinishing conditions, as used herein, are conditions within the above-defined ranges that when used in conjunction with the selected hydrofinishing catalyst results in a lubricating oil product meeting the desired specifications, i.e. color, etc.

The lubricating oil basestocks resulting from the presently disclosed process will have viscosity indexes ("VI") of about 110 to about 130, preferably about 115 to about 125. These basestocks will also have excellent volatility and low temperature properties.

The above description is directed to preferred embodiments of the present invention. Those skilled in the art will recognize that other embodiments that are equally effective could be devised for carrying out the spirit of this invention.

The following examples will illustrate the improved effectiveness of the present invention, but is not meant to limit the present invention in any fashion.

EXAMPLES

Example 1

A raffinate having a Viscosity Index ("VI") of 90, (following solvent dewaxing) and having a wax content of 15 wt. % was used to produce a basestock having a dewaxed oil VI of 115. The raffinate was hydrotreated at 370° C., hydrogen pressure of 1800 psi, and liquid hourly space velocities ("LHSV") of 0.35 $hr^{-1}$. The raffinate was hydrotreated with a commercial catalyst obtained from Akzo Nobel and marketed under the name KF-840. The results of this Example are contained in Table 1 below.

Examples 2 and 3

It should be noted that the Examples that follow, namely Examples 2 and 3, are based on information derived from models and estimates from related experiments. These examples illustrate approaches to upgrading a raffinate to 115 VI but instead using a combination of hydrotreating and hydrodewaxing. (A hydrofinishing step would normally be used in a commercial process but was not considered germane to demonstrating the invention) The catalyst used for hydrodewaxing comprises a noble metal on a bound zeolite (ZSM-48).

The key properties of the solvent dewaxed basestock are the relationship between the kinematic viscosity and volatility and formulated oil low temperature properties. A volatility of less than 15% Noack is excellent for a viscosity of 4.5 cSt @ 100 C. The Mini-Rotary Viscosity (MRV) in a 5W30 formulation was measured at 35,000 cP.

Example 2

The raffinate used in this Example was the same as described in Example 1 above. The hydrotreating conditions included temperatures of 360–380° C., pressures up to 2500 psig and liquid hourly space velocities ("LHSV") of 0.2 to 2 $hr^{-1}$, along with utilizing the same KF-840 catalyst of Example 1. The hydrodewaxing conditions conditions needed to achieve the target pour point of –18° C. are in the range 330 to 340° C. for a process operating at 1800 psi $H_2$ and at a LHSV of 1.0 v/v/hr.

Thus, in this Example, the raffinate was hydrotreated to produce a hydrotreated raffinate having a VI of 108. The hydrotreated raffinate was then dewaxed under the conditions described above to produce a basestock having a VI of 115. The results of this Example are contained in Table 1, below.

Example 3

As mentioned above, Example 3 also used a two step process involving hydrotreating under conditions similar to those outlined in Example 1 above followed by hydrodewaxing. However, the raffinate used in this Example was an underextracted raffinate having a wax content of 15 wt. % and a VI of 83 (dewaxed oil basis). The hydrodewaxing conditions were similar to those described above in Example 2.

In this Example, the underextracted raffinate was hydroteated to produce a hydrotreated underextracted raffinate having a VI of 108. The hydrotreated underextracted raffinate was then hydrodewaxed to produce a basestock having a VI of 115. The results of this Example are contained in Table 1, below.

TABLE 1

|  | Example 1 Hydrotreating only | Example 2 Hydrotreating + Hydrodewaxing | Example 3 Hydrotreating + Hydrodewaxing |
|---|---|---|---|
| Raffinate, Feed VI | 90 | 90 | 83 |
| Hydrotreating (DWO VI Target) | 115 | 108 | 108 |
| Basestock Properties |  |  |  |
| VI (Viscosity Index) | 115 | 115 | 115 |
| Viscosity, 100° C. cSt | 4.5 | 4.7 | 4.5 |
| Noack Volatility, % | 14.5 | 16 | 14.5 |
| Formulated Oil MRV, cP | 35,000 | 20,000 | 20,000 |
| Yield | Base | + | ++ |

The yield of Example 1 was used as a standard yield for comparison of the yields of Examples 2 and 3.

The data contained in Table 1 also illustrates that the process of Example 2 using a raffinate that is not underextracted produces a basestock having excellent Noack volatility at the given viscosity and excellent low temperature properties as defined by Formulated Oil Mini Rotary Viscosity (MRV) of 20,000 cP. Table 1 also illustrates that the low temperature properties of the formulated oil of Example 2 are substantially improved versus Example 1, however the viscosity/volatility relationship is poorer. Example 2 also demonstrated an increased yield over that obtained by hydrotreating only (Example 1).

The data contained in Table 1 also illustrates that the process of Example 3 using an under-extracted raffinate produces a basestock having excellent Noack volatility at viscosity and excellent low temperature properties as defined by Formulated Oil Mini Rotary Viscosity (MRV) of 20,000 cP. Thus, Table 1 shows that the product of Example 3 has both excellent low temperature properties and an excellent viscosity/volatility relationship. This also results in an increased yield over that obtained by hydrotreating and hydrodewaxing the standard raffinate illustrated in Example 2. Example 3 shows the benefit of utilizing an under-extracted raffinate in a combined hydrotreating-hydrodewaxing process.

Thus, these Examples demonstrate that by using an under-extracted raffinate, a refiner can produce superior yields of basestocks having excellent Noack volatility and low temperature properties than by using a raffinate that is not underextracted.

What is claimed is:

1. A process to prepare lubricating oil basestocks having a VI of at least about 110 to about 130 from a lube oil boiling range feedstock comprising:
    a) conducting a lubricating oil feedstock to a solvent extraction zone and underextracting the lubricating oil feedstock under conditions effective at producing at least an aromatics-lean raffinate solution;
    b) removing at least a portion of the extraction solvent from the aromatics-lean raffinate solution to produce a raffinate feedstock having a dewaxed oil viscosity index from about 75 to about 105 and a wax content of greater than 15 wt. %;
    c) contacting the raffinate feedstock with a hydrotreating catalyst in a first reaction stage operated under effective conditions to produce at least a gaseous product and a hydrotreated feedstock, wherein said hydrotreating catalyst has an acidity value of less than about 0.5, as determined by the scale of acidity for catalysts described by Kramer and McVicker, J. Catalysis, 92, 355 (1985);
    d) stripping the hydrotreated feedstock to separate at least a portion of the gaseous product from the hydrotreated feedstock to produce a stripped feedstock;
    e) contacting the stripped feedstock with a ZSM-48 dewaxing catalyst in a dewaxing zone operated under effective hydrodewaxing conditions, wherein said dewaxing catalyst contains Pt, Pd or mixtures thereof, thereby producing a lubricating oil basestock; and
    f) contacting the lubricating oil basestock from step e) with a mesoporous hydrofinishing catalyst from the M41S family in a hydrofinishing zone operated under effective hydrofinishing conditions to produce a hydrofinished lubricating oil basestock.

2. The process of claim 1 wherein the hydrotreating catalyst contains at least one metal selected from Group VI metals, Group VIII metals, and mixtures thereof.

3. The process of claim 1 wherein the dewaxing catalyst is sulfided, reduced, or sulfided and reduced.

4. The process of claim 1 wherein the hydrofinishing catalyst contains at least one metal selected from Group VI metals, Group VIII metals, and mixtures thereof.

5. The process according to claim 1 wherein said effective dewaxing conditions include temperatures of from 250–400° C., pressures of from 791 to 20786 kPa (100 to 3000 psig), liquid hourly space velocities of from 0.1 to 10 hr$^{-1}$, and hydrogen treat gas rates from 45 to 1780 m$^3$/m$^3$ (250 to 10000 scf/B).

6. The process according to claim 5 wherein said effective hydrotreating conditions include temperatures of from 150 to 400° C., a hydrogen partial pressure of from 1480 to 20786 kPa (200 to 3000 psig), a space velocity of from 0.1 to 10 liquid hourly space velocity (LHSV), and a hydrogen to feed ratio of from 89 to 1780 m$^3$/m$^3$ (500 to 10000 scf/B).

7. The process according to claim 6 wherein said effective hydrotreating conditions are selected such that less than 5 wt. % of the feedstock is converted to 650° F. (343° C.) minus products and wherein the VI increase of said hydrotreated feedstock is less than 4 greater than the VI of the lube oil boiling range feedstock.

8. The process according to claim 1 wherein the hydrofinishing catalyst further comprises at least one noble metal.

9. The process according to claim 1 wherein said hydrotreating catalyst is a hydrotreating catalyst selected from bulk and supported hydrotreating catalysts.

10. The process according to claim 9 wherein said hydrotreating catalyst is a supported hydrotreating catalyst having a support selected from low acidic metal oxide supports.

11. The process according to claim 10 wherein said low acidic metal oxide supports are selected from silica, alumina and titania.

12. The process according to claim 1 wherein said lubricating oil feedstock has a 10% distillation point greater than 650° F. (343° C.), as measured by ASTM D 86 or ASTM 2887, and is derived from mineral sources, synthetic sources, and mixtures of the two.

13. The process according to claim 12 wherein said hydrotreating catalyst is a supported hydrotreating catalyst having a support selected from low acidic metal oxide supports.

14. The process according to claim 13 wherein said low acidic metal oxide supports are selected from silica, alumina and titania.

15. A process to prepare lubricating oil basestocks having a VI of at least about 110 to about 130 from a lube oil boiling range feedstock comprising:
    a) conducting a lubricating oil feedstock to a solvent extraction zone and under-extracting the lubricating oil feedstock under conditions effective at producing at least an aromatics-lean raffinate solution;
    b) removing at least a portion of the extraction solvent from the aromatics-lean raffinate solution to produce a raffinate feedstock having a dewaxed oil viscosity index from about 75 to about 105 and a wax content of at least about 15 wt. %;
    c) contacting the raffinate feedstock with a hydrotreating catalyst containing at least one metal selected from Group VI metals, Group VIII metals, and mixtures thereof in a first reaction stage operated under effective conditions to produce at least a gaseous product and a hydrotreated feedstock, wherein said hydrotreating catalyst has an acidity value of less than about 0.5, as determined by the scale of acidity for catalysts described by Kramer and McVicker, J. Catalysis, 92, 355 (1985) and wherein said effective hydrotreating conditions are selected such that less than 5 wt. % of the feedstock is converted to 65° F. (343° C.) minus products, and wherein the VI increase of said hydrotreated feedstock is less than 4 greater than the VI of the lube oil boiling range feedstock.
    d) stripping the hydrotreated feedstock to separate at least a portion of the gaseous product from the hydrotreated feedstock to produce a stripped feedstock;

e) contacting the stripped feedstock with ZSM-48 dewaxing catalyst in a dewaxing zone operated under effective hydrodewaxing conditions, wherein said dewaxing catalyst contains Pt, Pd or mixtures thereof, thereby producing a lubricating oil basestock; and f) contacting the lubricating oil basestock with a MCM-41 hydrofinishing catalyst containing at least one noble metal in a hydrofinishing zone operated under effective hydrofinishing conditions thereby producing a hydrofinished lubricating oil basestock.

16. The process of claim 15 wherein the dewaxing catalyst is sulfided, reduced, or sulfided and reduced.

17. The process according to claim 15 wherein said effective dewaxing conditions include temperatures of from 250–400° C., pressures of from 791 to 20786 kPa (100 to 3000 psig), liquid hourly space velocities of from 0.1 to 10 hr$^{-1}$, and hydrogen treat gas rates from 45 to 1780 m$^3$/m$^3$ (250 to 10000 scf/B).

18. The process according to claim 17 wherein said effective hydrotreating conditions include temperatures of from 150 to 400° C., a hydrogen partial pressure of from 1480 to 20786 kPa (200 to 3000 psig), a space velocity of from 0.1 to 10 liquid hourly space velocity (LHSV), and a hydrogen to feed ratio of from 89 to 1780 m$^3$/m$^3$ (500 to 10000 scf/B).

* * * * *